(12) United States Patent
Galindo

(10) Patent No.: US 12,071,785 B1
(45) Date of Patent: *Aug. 27, 2024

(54) ABOVE GROUND TORNADO SHELTER

(71) Applicant: Steve Galindo, Tulsa, OK (US)

(72) Inventor: Steve Galindo, Tulsa, OK (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/666,280

(22) Filed: Feb. 7, 2022

Related U.S. Application Data

(63) Continuation-in-part of application No. 16/915,648, filed on Jun. 29, 2020, now Pat. No. 11,242,693.

(51) Int. Cl.
| | |
|---|---|
| *E04H 9/14* | (2006.01) |
| *E04B 1/16* | (2006.01) |
| *E04B 1/24* | (2006.01) |
| *E04B 1/343* | (2006.01) |
| *E04B 1/35* | (2006.01) |
| *E04B 2/84* | (2006.01) |
| *E04B 7/04* | (2006.01) |
| *E04B 7/20* | (2006.01) |
| *E06B 3/82* | (2006.01) |
| *E06B 3/96* | (2006.01) |
| *E06B 5/10* | (2006.01) |

(52) U.S. Cl.
CPC ............ *E04H 9/14* (2013.01); *E04B 1/16* (2013.01); *E04B 1/2403* (2013.01); *E04B 1/3505* (2013.01); *E04B 2/84* (2013.01); *E04B 7/04* (2013.01); *E04B 7/20* (2013.01); *E06B 3/822* (2013.01); *E06B 3/9604* (2013.01); *E06B 5/10* (2013.01); *E04B 2001/2427* (2013.01); *E04B 2103/02* (2013.01)

(58) Field of Classification Search
CPC ........ E04B 1/16; E04B 1/2403; E04B 1/3505; E04B 2/84; E04B 7/04; E04B 7/20; E04B 2001/247; E04B 2103/02; E04H 9/14; E06B 3/822; E06B 3/9604; E06B 5/10

USPC ........................................................ 52/169.6
See application file for complete search history.

(56) References Cited

U.S. PATENT DOCUMENTS

| | | |
|---|---|---|
| 3,512,316 A | 5/1970 | Parr |
| 3,847,341 A | 11/1974 | Stickler, Jr. |
| 4,787,181 A | 11/1988 | Witten et al. |
| 5,123,874 A | 6/1992 | White, III |
| 5,224,315 A | 7/1993 | Winter, IV |
| 6,948,281 B1 | 9/2005 | Carmichael |
| 8,534,001 B2 | 9/2013 | Scott, IV |
| 8,621,790 B2 | 1/2014 | Lekhtman |

(Continued)

OTHER PUBLICATIONS

Galindo, "Abandoned U.S. Appl. No. 15/276,685 by Steve Galindo filed Sep. 26, 2016; not published".

*Primary Examiner* — Brian E Glessner
*Assistant Examiner* — James J Buckle, Jr.
(74) *Attorney, Agent, or Firm* — James F. Lea, III; Gable Gotwals

(57) ABSTRACT

A tornado shelter and having a reinforced monolithic construction resulting from a single pour of concrete is described herein. Rebar extends upwardly from a base. The rebar is encased in concrete that forms the walls of the shelter. An upper portion of the rebar extend above a top surface of each of the walls. The upper portion of each of said rods are bent inwards and are also encased in the single pour of concrete for strengthening a ceiling portion of the shelter. A door, in-wall conduits, vent orifices and attached benches may also be provided.

14 Claims, 14 Drawing Sheets

(56) References Cited

U.S. PATENT DOCUMENTS

| | | | |
|---|---|---|---|
| 9,797,153 B2 | 10/2017 | Baggiero, II et al. | |
| 10,240,337 B2 | 3/2019 | Evert | |
| 10,584,509 B1 | 3/2020 | Zagorski | |
| 11,859,404 B2 * | 1/2024 | Yano | E04H 9/14 |
| 2002/0174606 A1 * | 11/2002 | Hunt | E04C 2/521 |
| | | | 52/561 |
| 2003/0075285 A1 | 4/2003 | Anderson et al. | |
| 2003/0126805 A1 | 7/2003 | Roberts | |
| 2005/0284035 A1 | 12/2005 | DeOvando et al. | |
| 2006/0185260 A1 | 8/2006 | Dehart | |
| 2009/0004430 A1 | 1/2009 | Cummins et al. | |
| 2009/0217600 A1 | 9/2009 | De Azambuja | |
| 2010/0043309 A1 | 2/2010 | Martin et al. | |
| 2010/0050556 A1 | 3/2010 | Burns | |
| 2012/0222367 A1 | 9/2012 | Wirtz | |
| 2013/0019542 A1 | 1/2013 | Bishop | |
| 2014/0259976 A1 | 9/2014 | Bowers et al. | |
| 2015/0068466 A1 | 3/2015 | Piccioni | |
| 2015/0096478 A1 | 4/2015 | Magiera | |
| 2015/0308135 A1 | 10/2015 | Athanasiou et al. | |
| 2017/0211268 A1 | 7/2017 | Eichhorn et al. | |

\* cited by examiner

① CONCRETE FOUNDATION OR FLOOR BY OTHERS

② TRIM OUT VERTICAL LEG OF BASE FOR DOORS.

③ DOORS BEYOND

④ CONCRETE FILLED WALL

⑤ CONCRETE FILLED WALL BEYOND

⑥ CONCRETE FILLED ATTIC

⑦ 4"x3"x 1/4" STEEL ANGLE RAFTERS @ 42" ON CENTERS

⑧ SHORED UP 3/4" PLYWOOD CONCRETE FORMS

⑨ 1/2" STEEL ROD SLIDE LATCH

① CONCRETE FOUNDATION OR FLOOR BY OTHERS

② TRIM OUT VERTICAL LEG OF BASE FOR DOORS.

③ DOORS PAIRED RE: DETAIL 2
④ CONCRETE FILLED WALL
⑤ CONCRETE FILLED ATTIC
⑥ 4"x3"x 1/4" STEEL ANGLE RAFTERS @ 42" ON CENTERS

⑦ SHEET METAL CORNER TRIM

1. CONCRETE FOUNDATION OR FLOOR BY OTHERS
2. SHEET METAL CORNER TRIM
3. CONCRETE FILLED WALL
4. CONCRETE FILLED ATTIC
5. 4"x3"x 1/4" STEEL ANGLE RAFTERS @ 42" ON CENTERS
6. VENT OPENING
7. 3"x3"x1/4" STEEL ANGLE SILL

ABOVE GROUND TORNADO SHELTER

CROSS REFERENCE TO RELATED APPLICATIONS

This application is a Continuation-in-Part of U.S. patent application Ser. No. 16/915,648 titled "ABOVE GROUND TORNADO SHELTER," filed Jun. 29, 2020, the contents of which are hereby incorporated by reference.

FIELD OF THE INVENTION

This application relates generally to structures, and more particularly to a monolithic tornado shelter that can be easily installed in or around a finished building such as a home or school.

BACKGROUND OF THE INVENTION

Tornados kill dozens of people in the United States alone each year. They can arise suddenly and with extreme violence, making it difficult or impossible for many to seek community shelter. Hardened tornado shelters are typically expensive and require extensive construction, permits and significant money. Tornado shelters may also be unavailable for existing homes with a small yard for the same reasons. What is needed is a robust and affordable tornado shelter that can be easily installed in a garage or on a concrete pad near a home with minimal skill and expense required.

SUMMARY OF THE INVENTION

A tornado shelter is described herein. The tornado shelter has a base that defines four sides, four corners and a center. A plurality of rods, such as rebar, extend upwardly from each of the four sides. The rods may be welded to the base.

Walls extend upwardly from each of the four sides of the base. An upper portion of the rods extend above a top surface of each of the walls. The upper portion of each of said rods are bent towards said center of the base for strengthening a ceiling portion of the shelter. The rods located inside each of the walls and the upper portion of the rods inside said ceiling portion are encased in a monolithic concrete member resulting from a single pour.

A door is preferably provided within a door opening formed in at least one of the walls. A conduit may be provided within at least one of the walls and the ceiling portion. An orifice may be provided within at least one of the walls for air ventilation. A bench may be affixed to the base.

The tornado shelter may be constructed by placing the base at a desired location. The base provided with an outer angle iron extending upwardly at each of said four corners and an inner angle iron extending upwardly at each of the four corners. The vertical rods are affixed to the base. An inside concrete form is placed adjacent to the inner angle iron and an outside concrete form is placed adjacent to the outer angle iron. The vertical rods are between the inside concrete form and said outside concrete form. A top ceiling form is placed on a top surface of the inside concrete form. An upper portion of the rods that extend above the top surface of the inside concrete form and the outside concrete form are bent towards the center of the base. A single pour of concrete is poured for filling a space between the inside concrete form and the outside concrete form and for covering the upper portion of the rods above the top ceiling form.

After the concrete cures, the inside concrete form, the outside concrete form and the top ceiling form may be removed. A door may be hingedly affixed in a door opening in one of the walls. A conduit may be placed in between the inside and outside concrete forms and above the ceiling form. Vents may be formed in at least one of the walls. A bench may be affixed to the base.

Tornado shelters are disclosed that are made from a monolithic steel frame welded together onsite or in a factory and then transported to the shelter location where concrete is poured into the frame creating a robust, durable, and safe shelter.

In one embodiment, a channel, such as a steel channel is placed for a base in a square or rectangular configuration. In a preferred embodiment, the channel is 6" in width.

An angle iron is vertically affixed at an inside corner and an outside corner at each corner of the base. In a preferred embodiment, the angle iron and rebar are welded to the base. In a preferred embodiment, the rebar is 10' in length. The upper 4' of the rebar is bent towards the inside of the building for strength.

Inside forms and outside forms are placed adjacent to the vertical angle iron and rebar. A top ceiling form is placed on a top surface of the inside forms. The rebar is further bent to the center of the structure over the top panel.

A single pour of cement is poured to deliver concrete between the inside forms and outside forms and above the top ceiling form. The inside forms and the ceiling form is removed after the cement has cured.

A door is constructed with square tubing. The door preferably has steel skin on both sides. The door components will be layered and welded to a flat area in front to the doorway framed wall channel. All of the door structure is welded together for strength. Preferably, the door will swing to the inside and will be provided with two cross-door latch bars to lock the door in place.

In a preferred embodiment, the units will have conduit located in the walls for future electric installations. Additionally, the unit is preferably provided with two 4" by 16" orifices for air ventilation. The unit is preferably provided with two welded benches located in the unit.

BRIEF DESCRIPTION OF THE DRAWINGS

FIG. 6 is a plan view of an exemplary tornado shelter showing support beams in a ceiling portion of the shelter;

DETAILED DESCRIPTION OF THE PREFERRED EMBODIMENTS

The following description supplies specific details in order to provide a thorough understanding. Nevertheless, the skilled artisan would understand that embodiments of tornado shelter frames and associated methods of using them can be implemented and used without employing these specific details. Indeed, exemplary embodiments and associated methods can be placed into practice by modifying the illustrated units and associated methods and can be used in conjunction with any other devices and techniques conventionally used in the industry. For example, while the description below generally focuses on an embodiment with a complete frame constructed prior to transportation, the frame may be formed in panels or sections prior to final welding and assembly on site.

One exemplary embodiment of a monolithic tornado shelter frame (shelter) 100 is illustrated in FIGS. 1-6. Shelter 100 may include frame 110, base 120, and roof 130. Frame 110, base 120, and roof 130 may be formed from steel and welded together to form a monolithic shelter frame 100. Frame 110 may be formed (as illustrated) of angle iron welded together to form a skeleton that may then be formed up with concrete to finish the walls and ceiling. Shelter 100 may be installed inside of a garage, on a back porch or on some other concrete surface to provide a stable foundation. The shelter may be stocked with supplies for an emergency, leaving enough room for people and pets to comfortably and safely ride out a tornado.

Figure 1:
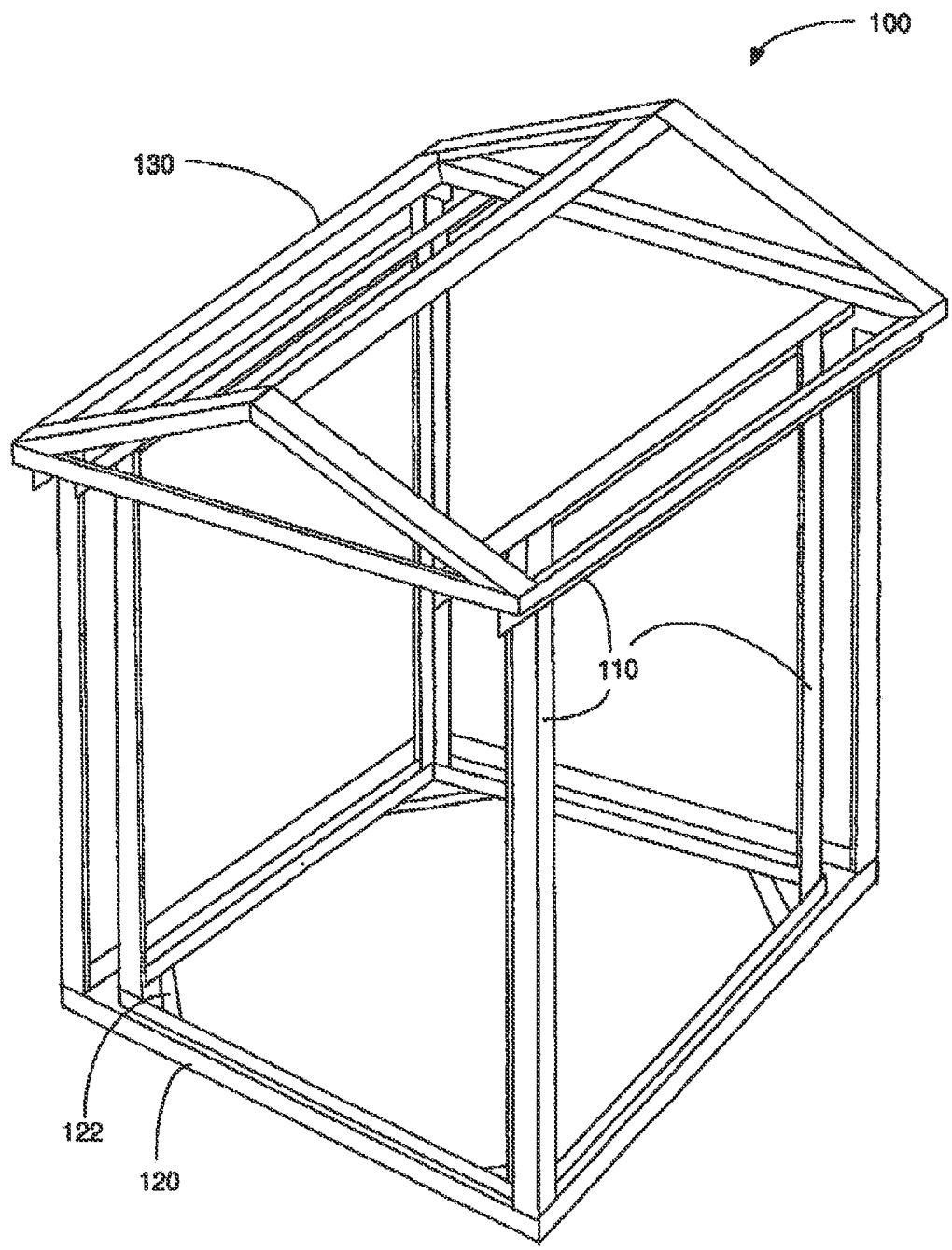
FIG. 1 is a drawing of an exemplary monolithic tornado shelter frame prior to door and vent installation.
Figure 2:
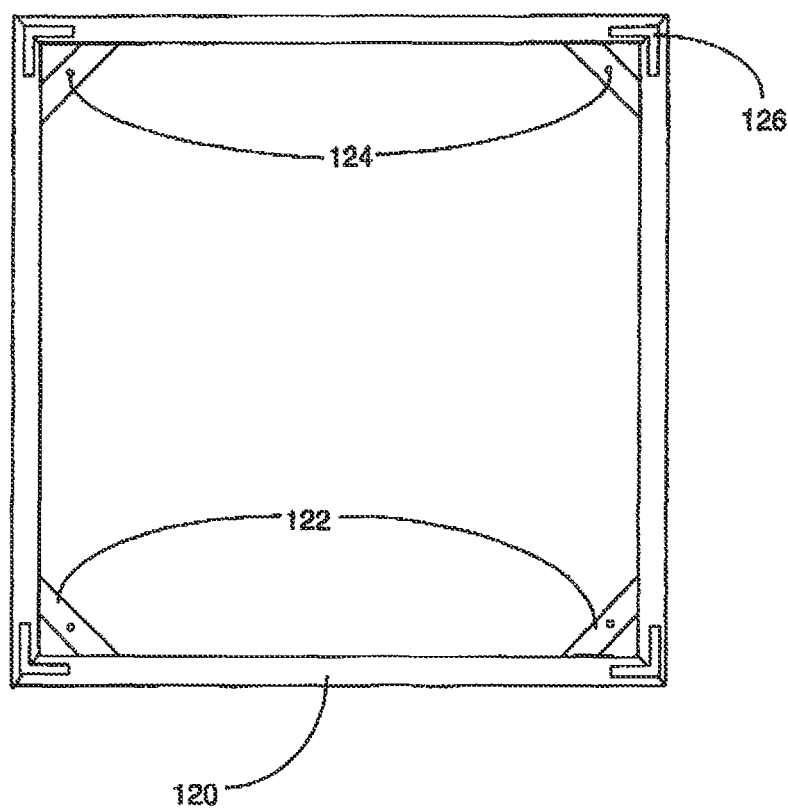
FIG. 2 is a top view of a base of an exemplary monolithic tornado shelter frame.

Turning to FIG. 2, base 120 may include a periphery formed from channel steel to provide a bottom support for the concrete and a strong base for the tornado shelter. The channel steel may be selected to form a desired thickness of wall depending on the size of the shelter and the desired strength. For example, 6×3×⅜ inch channel steel may be selected for a structure with six inch thick walls and strong crush resistance. The channel steel may be welded together at the corners to form a monolithic steel base for shelter 100. Corner braces 122 may be welded into the corners to provide anchor points 124 to secure base 120 and shelter 100 to a concrete floor or pad. Each corner may further include reinforcing braces 126 to further strengthen base 120.

Figure 3:
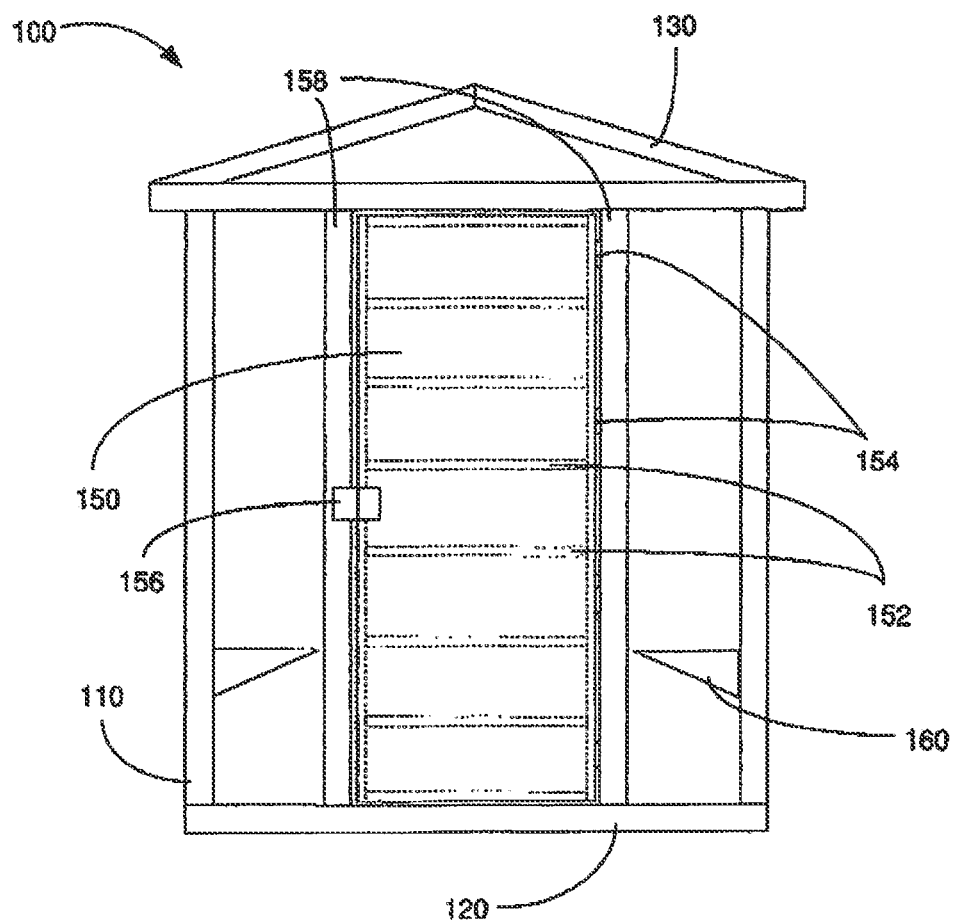
FIG. 3 is a front view of an exemplary monolithic tornado shelter frame with a door and door jamb installed.

Turning to FIG. 3, shelter 100 may include door 150 and benches 160. Door 150 may be formed from 1"×⅜" tube steel (or other suitable sized steel) body welded in a ladder formation and with a sheet steel skin on the outside or on both the outside and inside to resist damage from flying debris. Door 150 may be secured to shelter 100 between door frame pillars 158 formed of channel steel and welded to frame 110, base 120 and roof 130. Door 150 may be attached with strong hinges 154 and latch 156. Hinges 154 and latch 156 may be any strong and durable hinges and latches sufficient to withstand wind and debris damage that a tornado and collapsing home might inflict on door 150.

Roof or ceiling 130 may have a slight pitch and overhang from welding angle iron to each other to form the overhang and basic roof structure. The overhang will depend on the size of angle iron used and placed as desired. Roof 130 also includes a ridge that may be formed by welding angle iron together. It is important to note that structure 100 is made very strong by welding all structural components of shelter frame 100 together. Frame 110 may be formed using angle iron welded into the corners of base 120 and then welding to top plates of angle iron to form a structure for a poured concrete ceiling and roof within frame member of roof 130.

Figure 4:
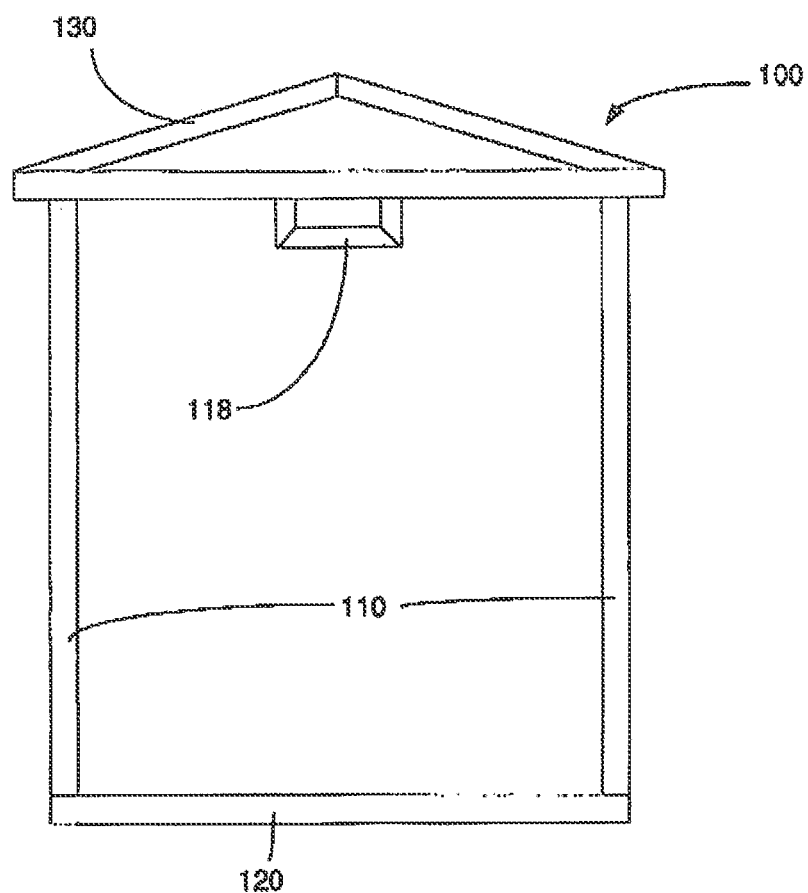
FIG. 4 is a back view of an exemplary monolithic tornado shelter frame with a pressure vent.

As shown in FIG. 4, a small pressure vent 118 may be included in a side or back of shelter 100. The vent 118 may be formed from angle iron welded to the top plate and under the overhang to prevent blockage and debris from harming people inside of the shelter in an emergency. Preferably, vent 118 and surrounding structure are of sufficient strength that the vent opening can be used as lift points for facilitating relocation of shelter 100.

Figure 5A:
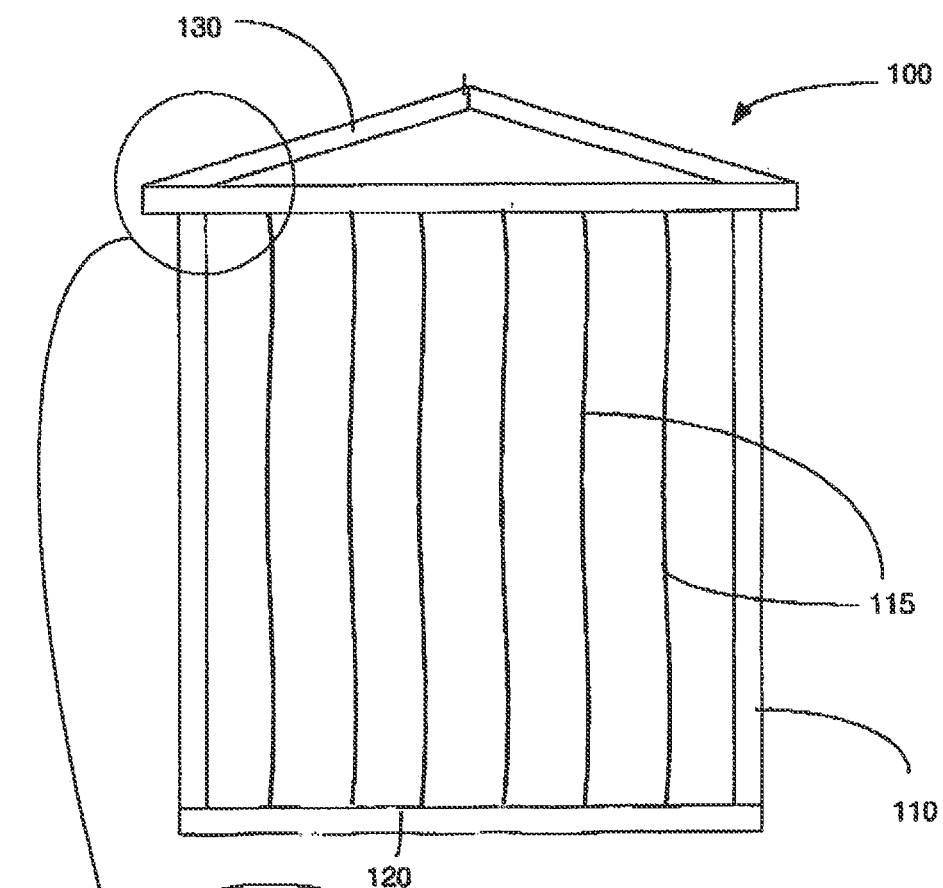
FIG. 5A illustrates rebar placement in the walls and ceiling of an exemplary monolithic tornado shelter frame to effectively tie the steel frame to the concrete.
Figure 5B:
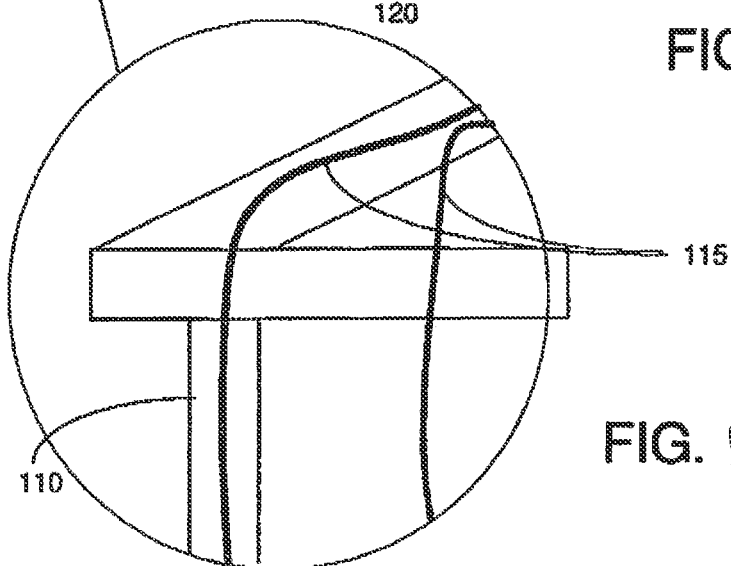
FIG. 5B illustrates an enlarged view of rebar placement in the walls and ceiling of the exemplary monolithic tornado shelter frame of FIG. 5A to effectively tie the steel frame to the concrete.

FIGS. 5A and 5B illustrate rebar reinforcement 115 placed within frame 110 and roof 130. The rebar 115 may be bent so that it is continuous from poured concrete walls and into the poured concrete ceiling. The rebar 115 may be welded to base 120, tied to frame ties used in the concrete forms, or may include horizontal rebar (not shown) tied in to achieve high strength in the final steel and concrete structure.

In some embodiments, a shelter frame such as is shown in the figures may be manufactured in a factory to avail cheaper labor and faster manufacturing. The frame may then be loaded onto a truck and placed at the desired location. The sizes of tornado shelter frames may be selected to fit inside of average garages and could be rolled into the garage under the garage door with dolly wheels, making installation fairly easy and without requiring structural modification and expensive building permits. The shelter 100 may be less than 7' tall to accommodate garages, under patios, etc.

Once in place, base 120 may be secured to the floor and concrete forms may be put into place and concrete poured to fill the walls and ceiling using conventional methods such as concrete pumps to allow the tornado shelter to be finally installed. Using this method, many homes may have tornado shelters that in the past may have cost lives.

Referring now to FIGS. 6-15, a tornado shelter 200 is disclosed that is made from a monolithic steel frame welded together onsite, or in a factory and then transported to the shelter location where concrete is poured into the frame creating a robust, durable, and safe shelter.

In one embodiment, tornado shelter 200 has base 210 defining sides, corners and a center. A plurality of rods 216 extending upwardly from each of the sides. A plurality of walls include walls that extend upwardly from each of the sides. Each of the walls have a top surface, the plurality of walls include at least a first wall and a second wall.

Roof structure 218 is supported on the top surface of the first wall and the top surface of the second wall. Support beams 226 span from the top surface of the first wall to the top surface of the second wall. Roof structure 218 and support beams 226 define attic space 228 therebetween. Concrete 230 fills attic space 228 and encase support beams 226. Support beams 226 add strength, which may be necessary to support concrete 230 in attic space 228. In one embodiment support beams 226 are encased in concrete 230 and form a part of a ceiling portion. In embodiment, a plurality of support beams 226 are used, e.g., two support beams 226 divide the ceiling portion into three sections. Support beams 226 are preferably at the same height as the ceiling portion.

Rods 216 extend upwardly from each of the sides. In one embodiment rods 216 are rebar. In one embodiment, rods 216 are welded to base 202. An upper portion of rods 216 extends above the top surface of each of the walls. The upper portion of each of rods 216 above the top surface of each of the walls are bent towards the center of base 210 and above support beams 226 for strengthening shelter 200. Door 240 is received in a door opening of one of the walls. In one embodiment, at least one of said walls and said ceiling portion define a conduit. In one embodiment, at least one of the walls define an orifice for air ventilation. In one embodiment, tornado shelter 200 includes a bench affixed to base 210.

In one embodiment, base channel 202 (FIG. 7), such as steel channel, comprise base assembly 210 in a square or rectangular configuration. In a preferred embodiment, the base channel 202 channel is 6" in width.

Figure 7:
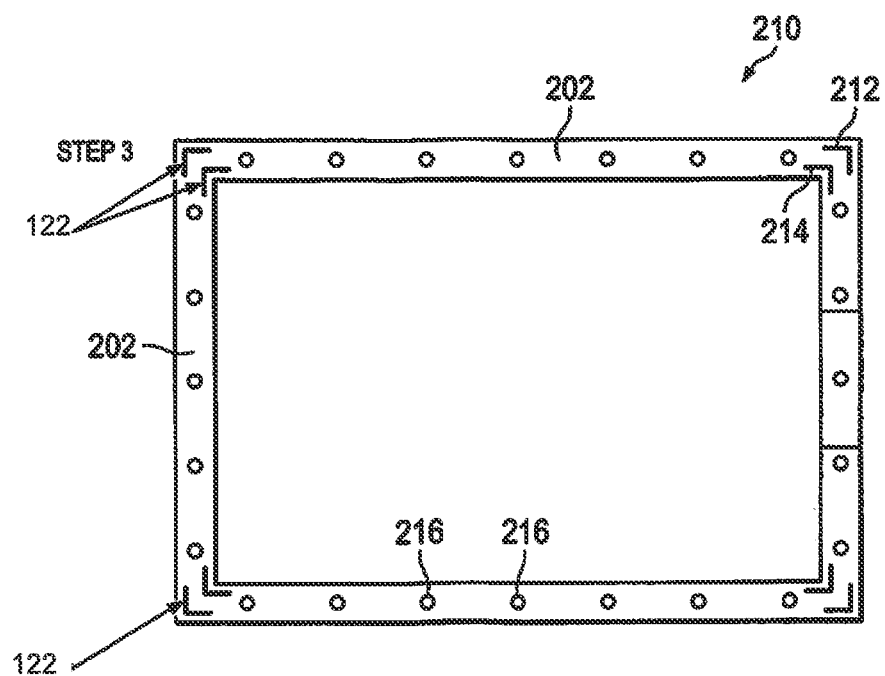
FIG. 7 is a plan view of a base of a second embodiment of a tornado shelter of the invention.
Figure 8:
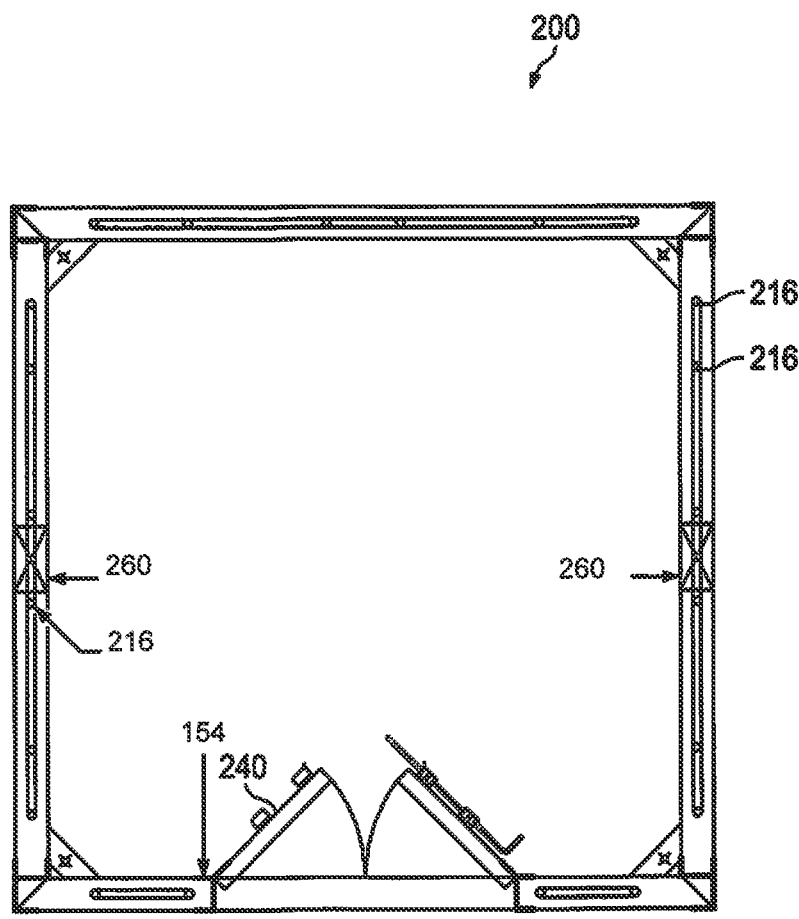
FIG. 8 is a plan view of the walls and door of the tornado shelter of FIG. 7.
Figure 9:
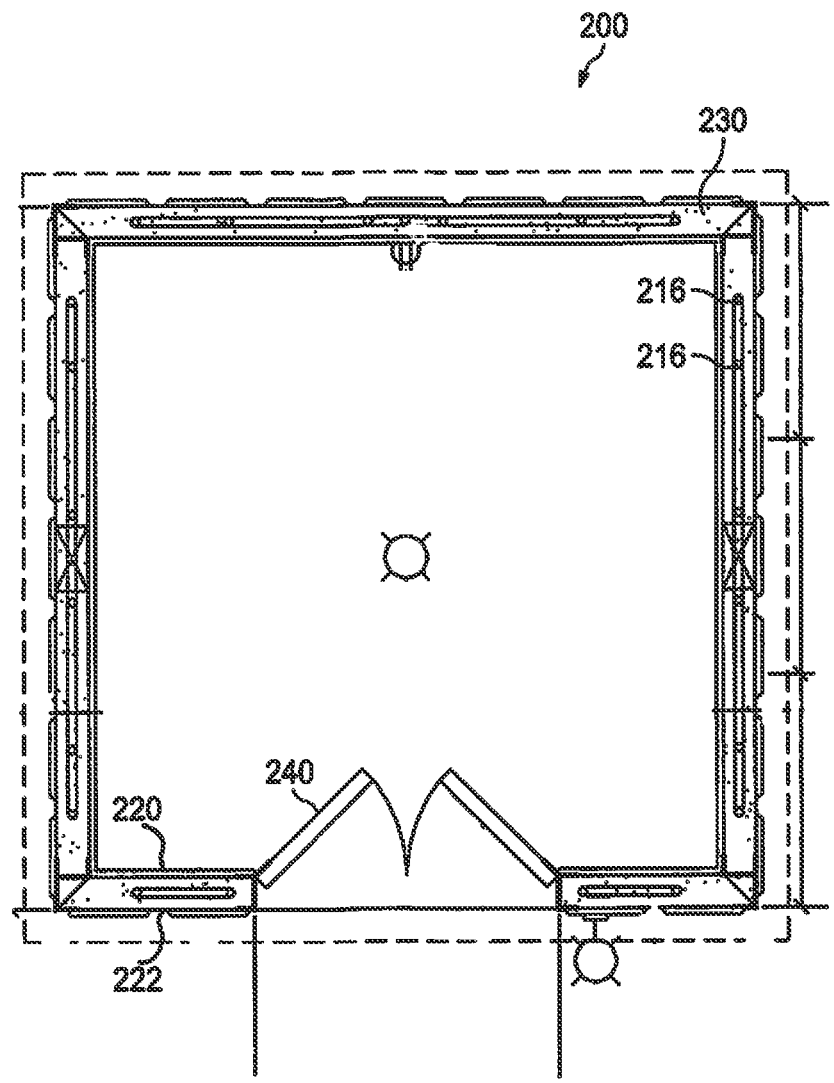
Figure 10:
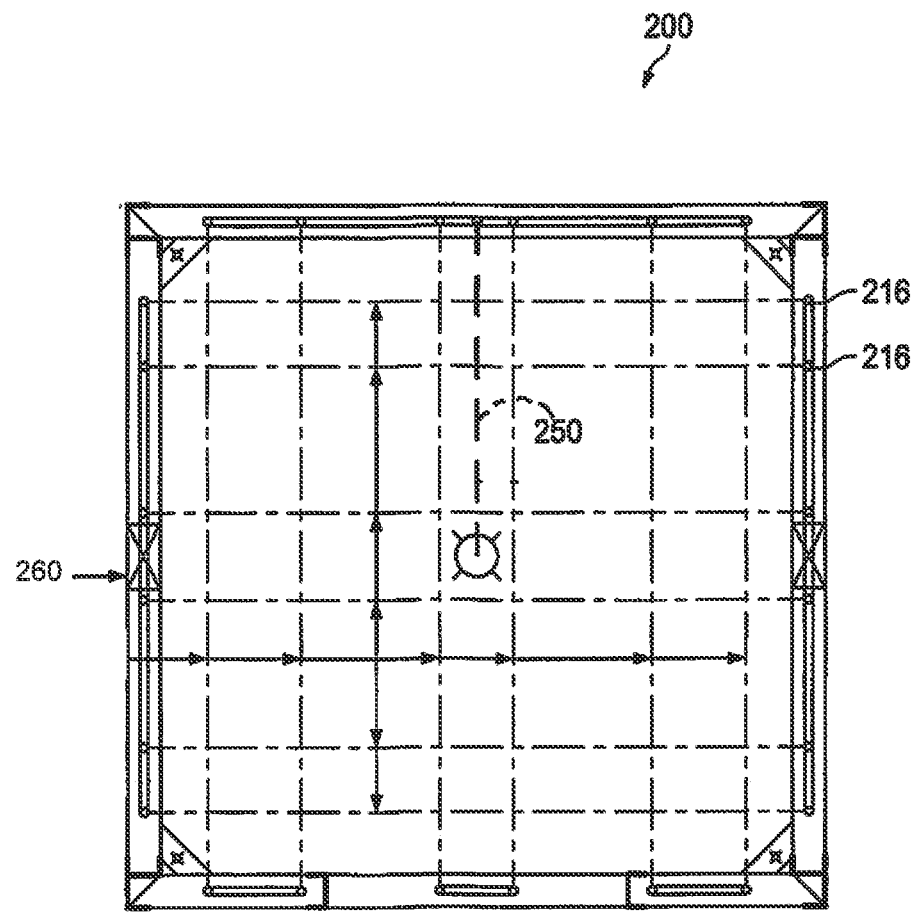
FIG. 10 is a plan view of the shelter of FIG. 7 showing the ceiling and electrical conduit.
Figure 11:
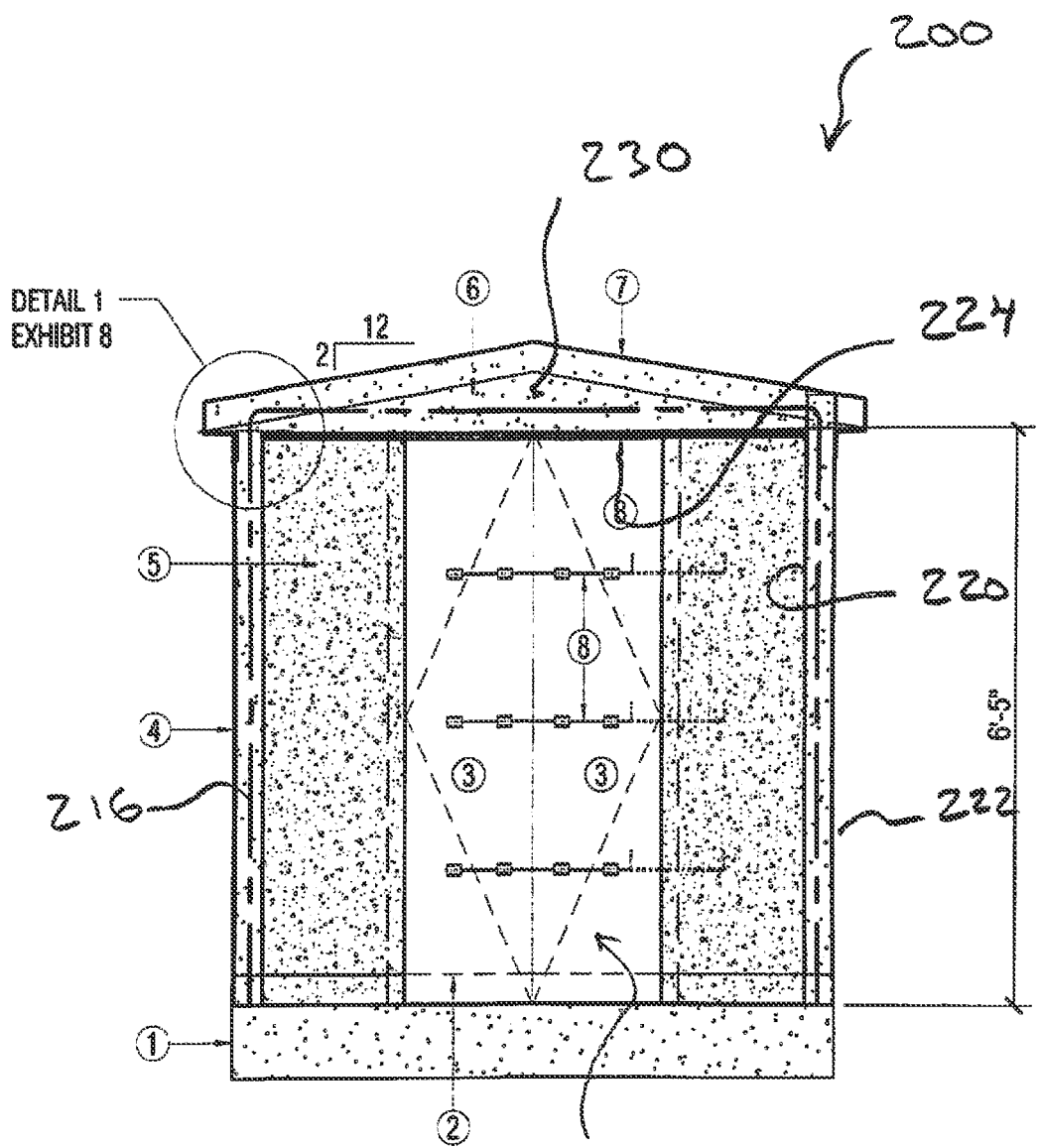
FIG. 11 is an elevation view of the shelter of FIG. 7 showing a wall with a door opening.
Figure 12:
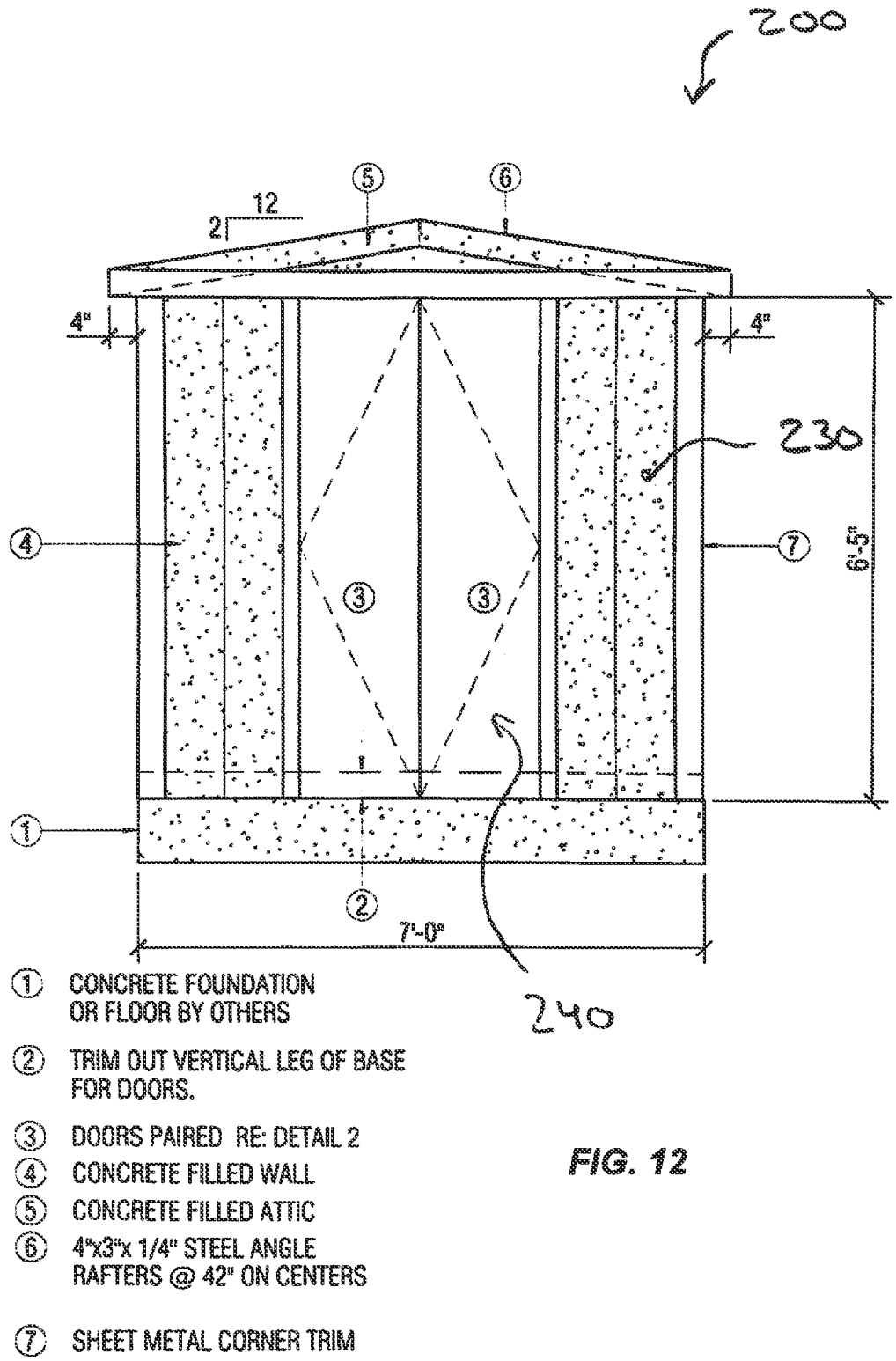
FIG. 12 is an elevation view of the shelter of FIG. 7 showing a wall with a door opening and door installed therein.
Figure 13:
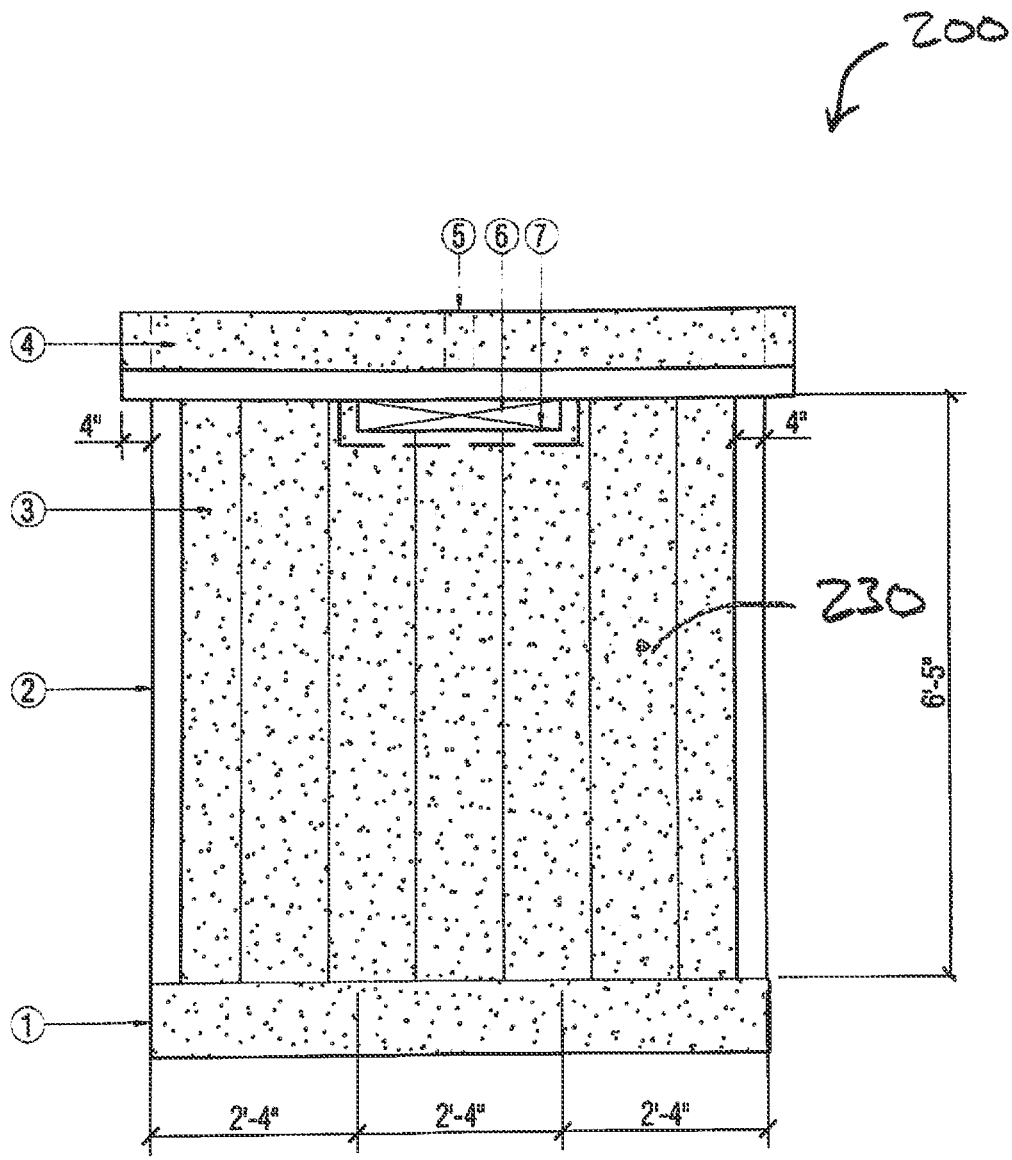
FIG. 13 is an elevation view of the shelter of FIG. 7 showing a vent opening formed in a wall.
Figure 14:
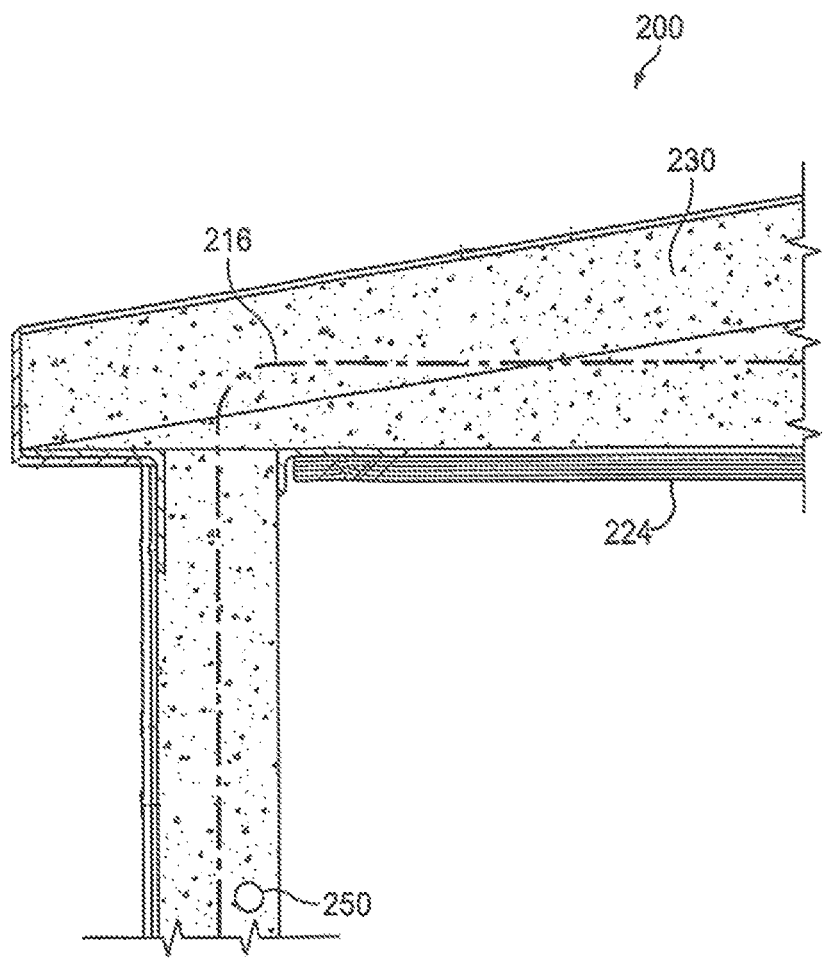
FIG. 14 is an enlarged cross sectional elevation view of an interface between a ceiling portion and a wall with bent rebar shown encased therein.

Still referring to FIG. 7, outer angle iron 212 is vertically affixed at an outside corner at each corner of base assembly 210. Inner angle iron 214 is vertically affixed at an inside corner at each corner of base assembly 210. Rebar 216 is vertically affixed to base channel 212 of base assembly 210. In a preferred embodiment, angle iron 212, 214 and rebar 216 are welded to base assembly 210. In a preferred embodiment, rebar 216 is 10' in length. As best seen in FIG. 14, the upper 4' of rebar 216 is bent towards the inside of the shelter 200 for strength.

Figure 9:
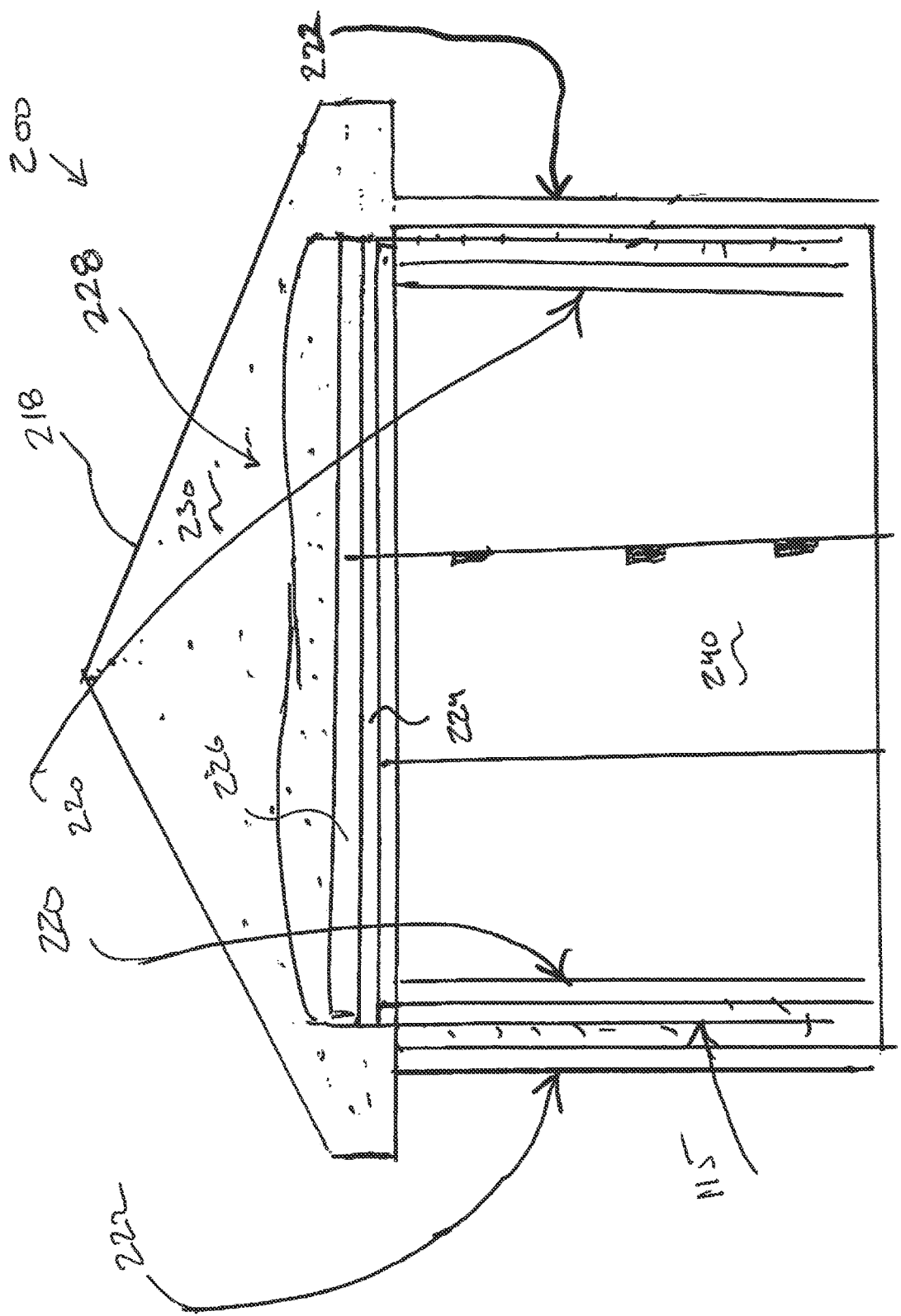
FIG. 9 is a cross section of the plan view of FIG. 8 showing openings and electrical conduit.

Inside forms 220 are placed adjacent to inner angle iron 214. Outside forms 222 are placed adjacent to outer angle iron 216 (FIG. 9). Top ceiling form 224 is placed on a top surface of the inside forms 220. Rebar 216 is further bent to the center of the shelter 200 over top ceiling form 224.

A single pour of cement 230 is poured to deliver concrete between inside forms 220 and outside forms 222 and above top ceiling form 224. Inside forms 220 and top ceiling form 224 is preferably removed after cement 230 has cured.

Door 240 is preferably constructed with square tubing. Door 240 preferably has steel skin on an inside surface and an outside surface. Components of door 240 are layered and welded to a flat area in front to a doorway framed wall channel. All of the structure of door 240 is preferably welded together for strength. Preferably, door 240 swings to the inside of structure 200 and will be provided with two cross-door latch bars to lock door 240 in place.

In a preferred embodiment, shelter 200 has conduit 250 located cement 230 forming the walls and/or ceiling of shelter 200 for possible electric installations. Additionally, shelter 200 may be provided with vents 260, e.g., two 4" by 16" orifices for air ventilation. Shelter 200 is preferably provided with two welded benches located inside shelter 200.

In one embodiment, a method of constructing tornado shelter 200 includes placing base 210 at a desired location. Base 210 defines sides, corners and a center. Base 210 has outer angle iron 212 extending upwardly at each of the corners and inner angle iron 214 extending upwardly at each of the corners. Rods 216 are affixed extending upwardly from the sides of base 210. Inside concrete form 220 are placed adjacent inner angle iron 214. Inside concrete form 220 have a top surface. Outside concrete form 222 are placed adjacent outer angle iron 212. Outside concrete form 222 has a top surface. Rods 216 are between inside concrete form 220 and outside concrete form 222. Ceiling form 224 is placed on said top surface of inside concrete form 220. Support beams 226 are placed above ceiling form 224. An upper portion of rods 216 extend above the top surface of inside concrete form 220 and outside concrete form 222. The upper portion of rods 216 are bent towards the center of base 210 above support beams 226.

In one embodiment a single pour of concrete 230 is poured for filling a space between inside concrete form 220 and outside concrete form 222 and for covering the upper portion of rods 216 and support beams 226 above ceiling form 224. Inside concrete forms 220, outside concrete forms 222 and ceiling forms 224 are removed.

Door 240 may be hingedly affixed in a door opening in one of said walls. Conduit 250 is placed in a location selected from a group consisting of in between outside concrete form 222 and inside concrete form 220 and above ceiling form 224. Vents 260 may be formed in at least one of the walls. A bench may be affixed to base 210.

In addition to any previously indicated modification, numerous other variations and alternative arrangements can be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use can be made without departing from the principles and concepts set forth herein. Also, as used herein, examples are meant to be illustrative only and should not be construed to be limiting in any manner.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

What is claimed is:

1. A tornado shelter comprising:
   a base defining sides, corners and a center;
   a plurality of rods extending upwardly from each of said sides;
   a plurality of walls comprising walls extending upwardly from each of said sides, each of said walls having a top surface, said plurality of walls comprising at least a first wall and a second wall;
   a roof structure supported on said top surface of said first wall and said top surface of said second wall;
   support beams that span from said top surface of said first wall to said top surface of said second wall, said roof structure and said support beams defining an attic space therebetween;
   concrete filling said attic space and encasing said support beams.

2. The tornado shelter according to claim 1 further comprising:
   a plurality of rods extending upwardly from each of said sides;
   wherein an upper portion of said rods extends above said top surface of each of said walls;
   wherein said upper portion of each of said rods above said top surface of each of said walls are bent towards said center of said base and above said support beams for strengthening the shelter.

3. The tornado shelter according to claim 2 wherein:
said rods are rebar.

4. The tornado shelter according to claim 2 wherein:
said rods are welded to said base.

5. The tornado shelter according to claim 1 wherein:
at least one of said walls define a door opening;
a door received in said door opening.

6. The tornado shelter according to claim 1 wherein:
said support beams are part of a ceiling portion;
at least one of said walls and said ceiling portion define a conduit.

7. The tornado shelter according to claim 1 wherein:
at least one of said walls define an orifice for air ventilation.

8. The tornado shelter according to claim 1 further comprising:
a bench affixed to said base.

9. A method of constructing a tornado shelter comprising the steps of:
placing a base at a desired location, said base defining sides, corners and a center, said base having an outer angle iron extending upwardly at each of said corners and an inner angle iron extending upwardly at each of said corners;
affixing rods extending upwardly from said sides of said base;
placing an inside concrete form adjacent said inner angle iron, said inside concrete form having a top surface;
placing an outside concrete form adjacent said outer angle iron, said outside concrete form having a top surface;
wherein said rods are between said inside concrete form and said outside concrete form;
placing a ceiling form on said top surface of said inside concrete form;
placing support beams above said ceiling form;
wherein an upper portion of said rods extend above said top surface of said inside concrete form and said outside concrete form;
bending said upper portion of said rods towards said center of said base above said support beams;
pouring a single pour of concrete for filling a space between said inside concrete form and said outside concrete form and for covering said upper portion of said rods and said support beams above said ceiling form.

10. The method according to claim 9 further comprising:
removing said inside concrete form, said outside concrete form and said ceiling form after said concrete cures.

11. The method according to claim 9 further comprising:
hingedly affixing a door in a door opening in one of said walls.

12. The method according to claim 9 further comprising:
placing a conduit in a location selected from a group consisting of in between said outside concrete form and said inside concrete form and above said ceiling form.

13. The method according to claim 9 further comprising:
forming vents in at least one of said walls.

14. The method according to claim 9 further comprising:
affixing a bench to said base.

* * * * *